Figure 1:
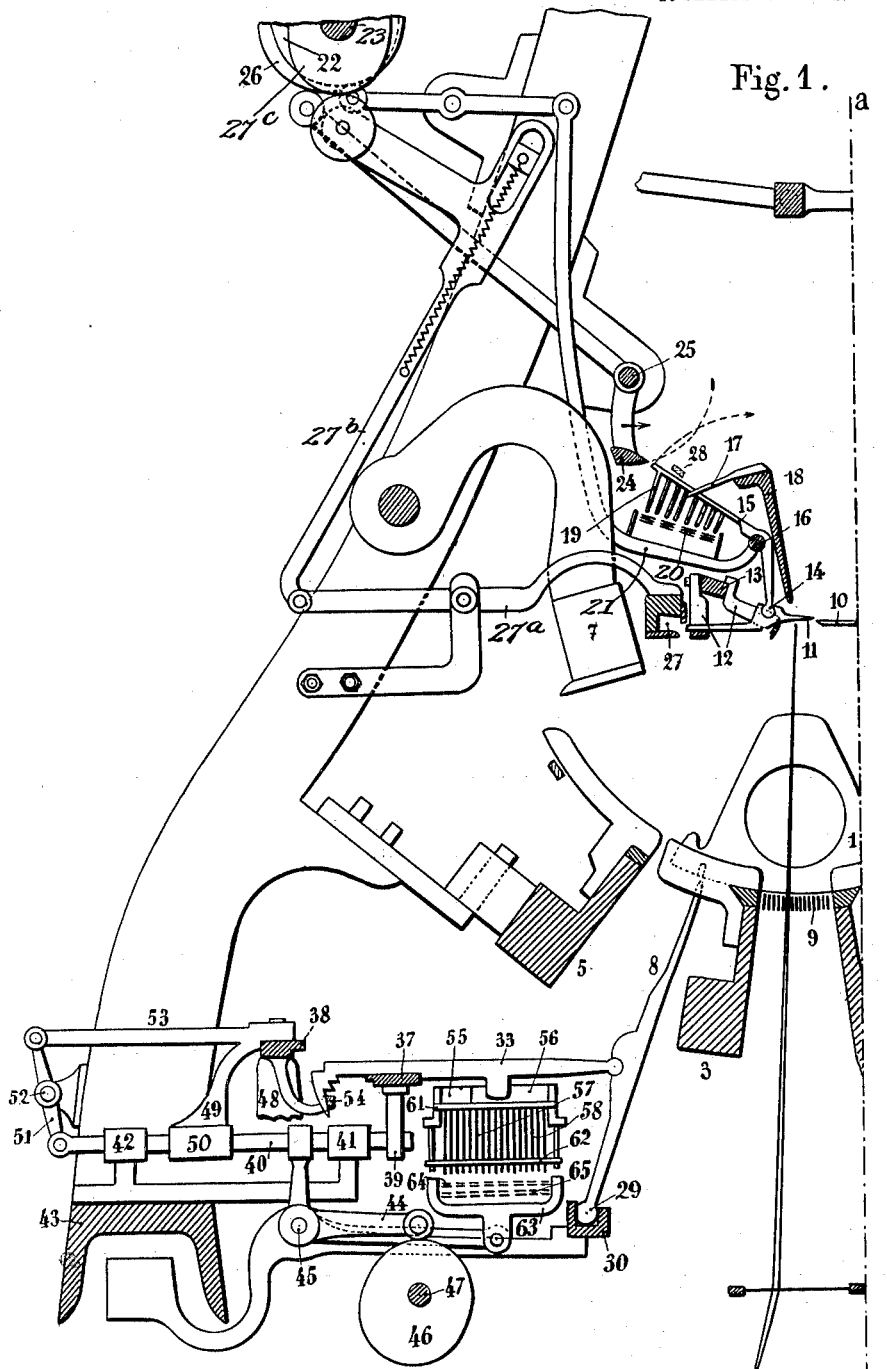

J. FARIGOULE.
LACE MACHINE.
APPLICATION FILED MAY 27, 1910.
1,112,996.
Patented Oct. 6, 1914.
10 SHEETS—SHEET 2.
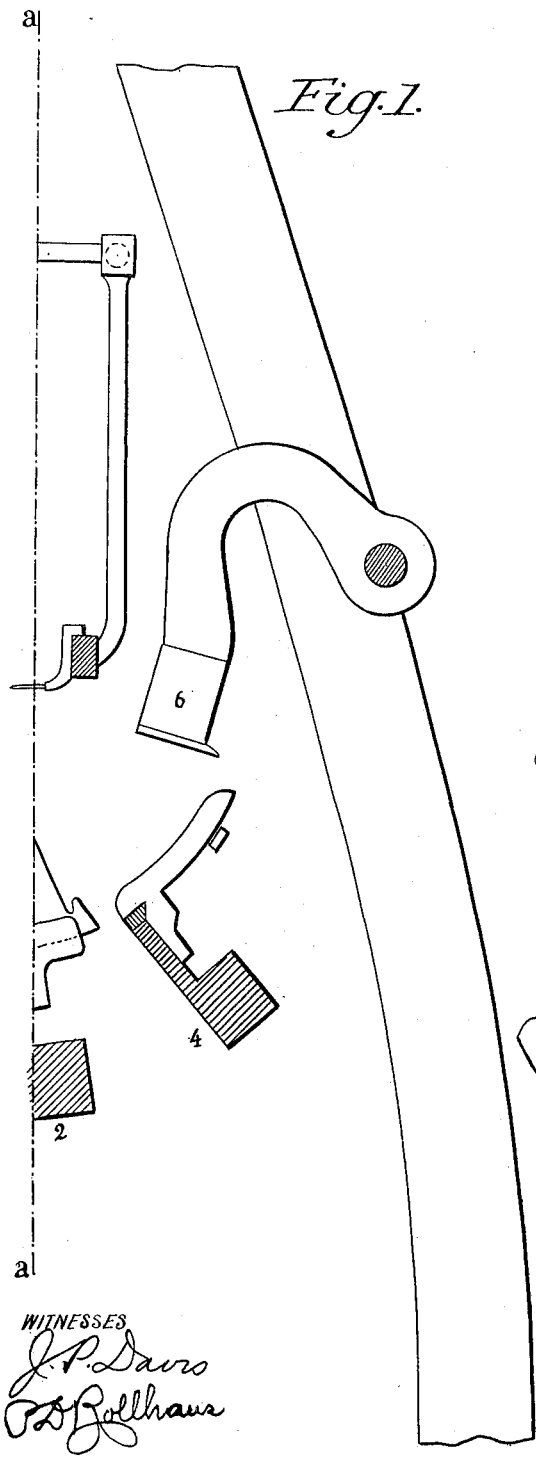
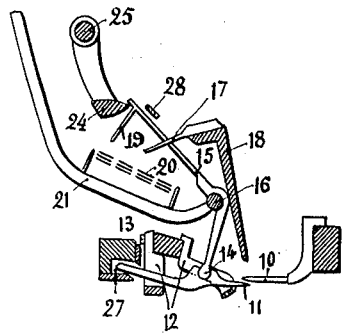
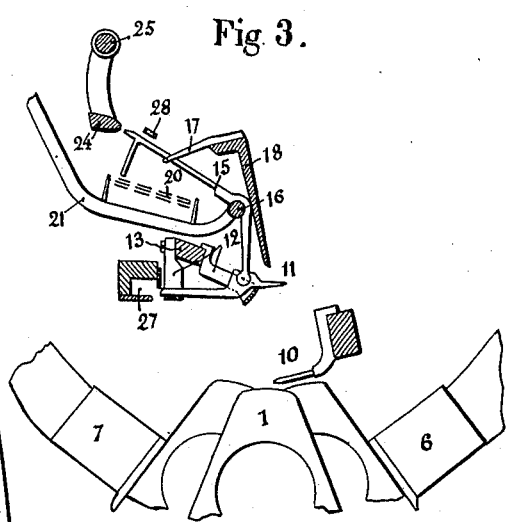
INVENTOR
Jean Farigoule

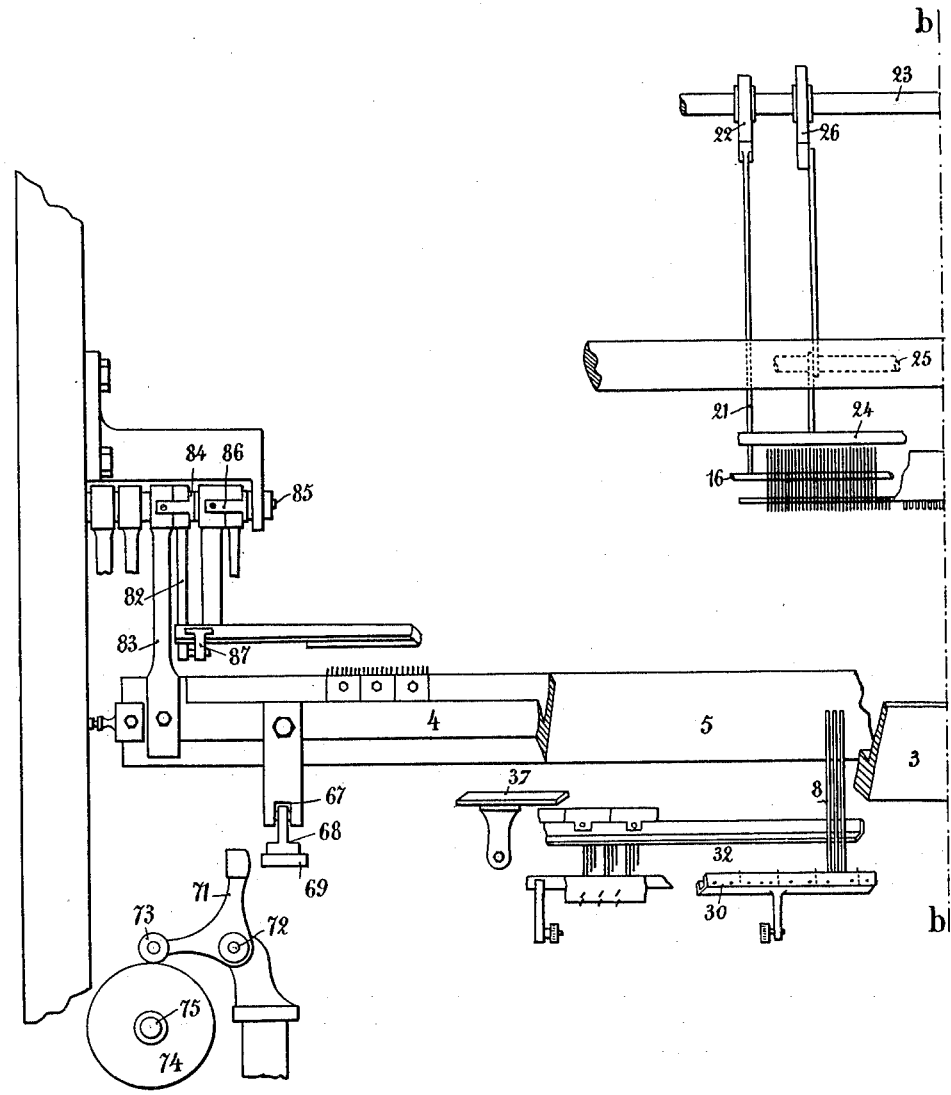

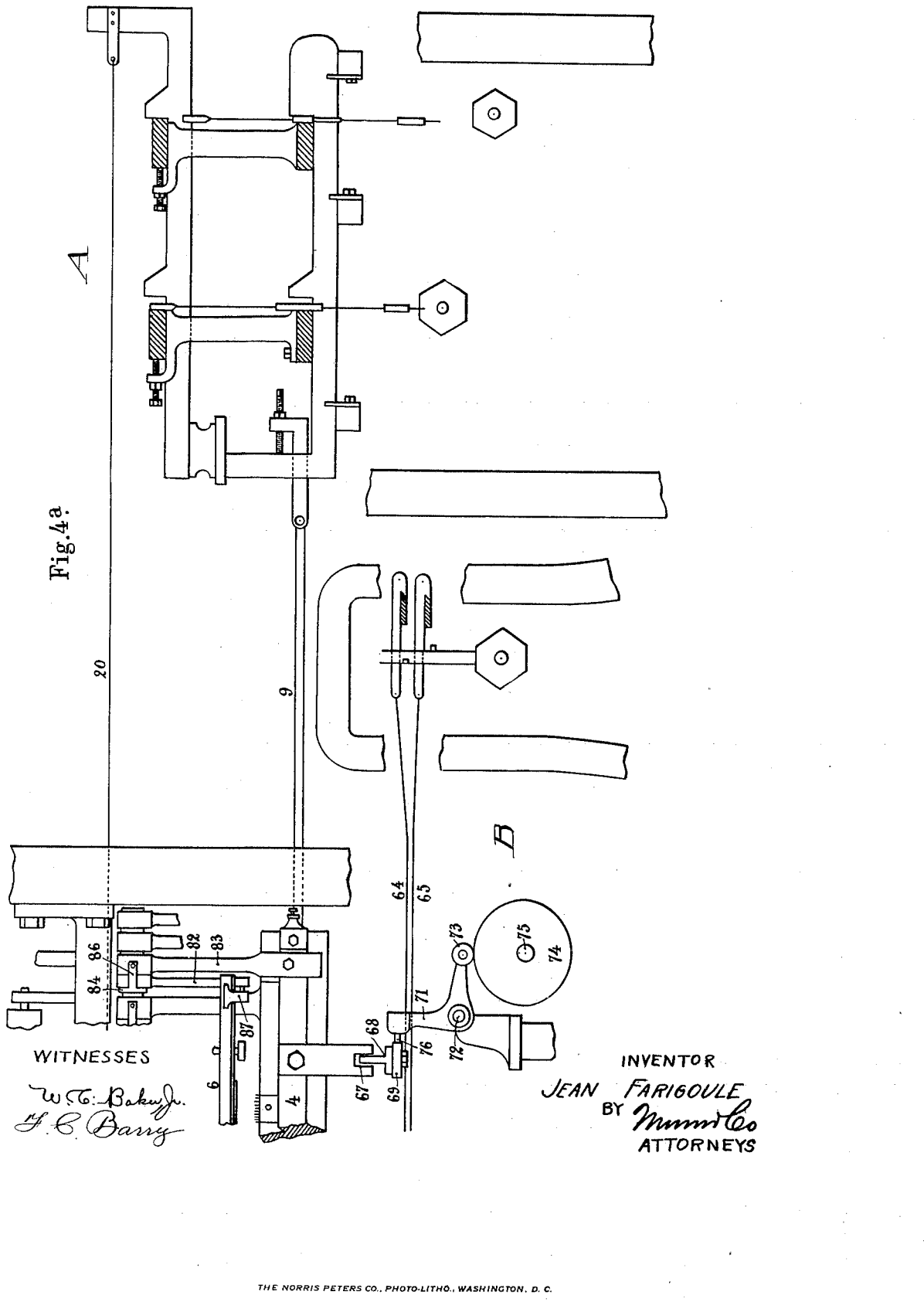

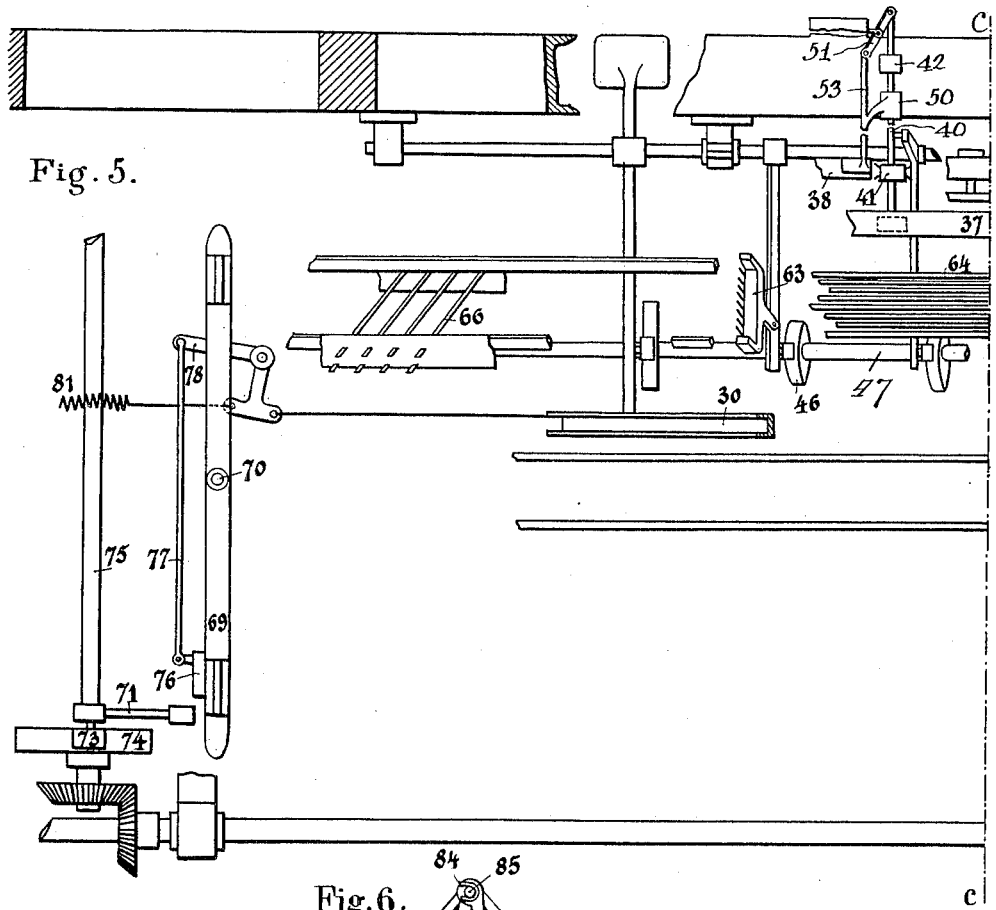
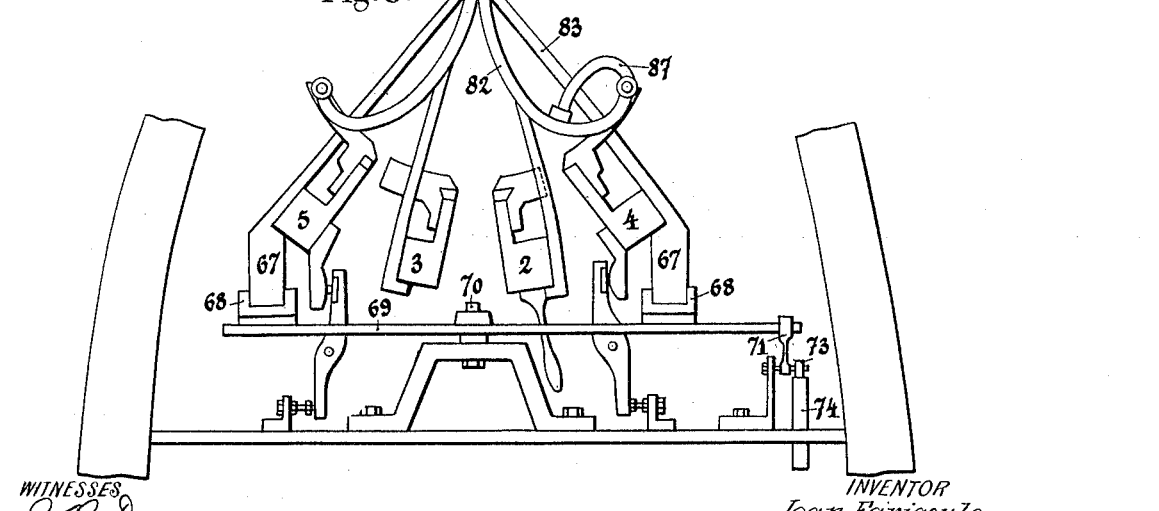

J. FARIGOULE.
LACE MACHINE.
APPLICATION FILED MAY 27, 1910.
1,112,996.
Patented Oct. 6, 1914.
10 SHEETS—SHEET 7.
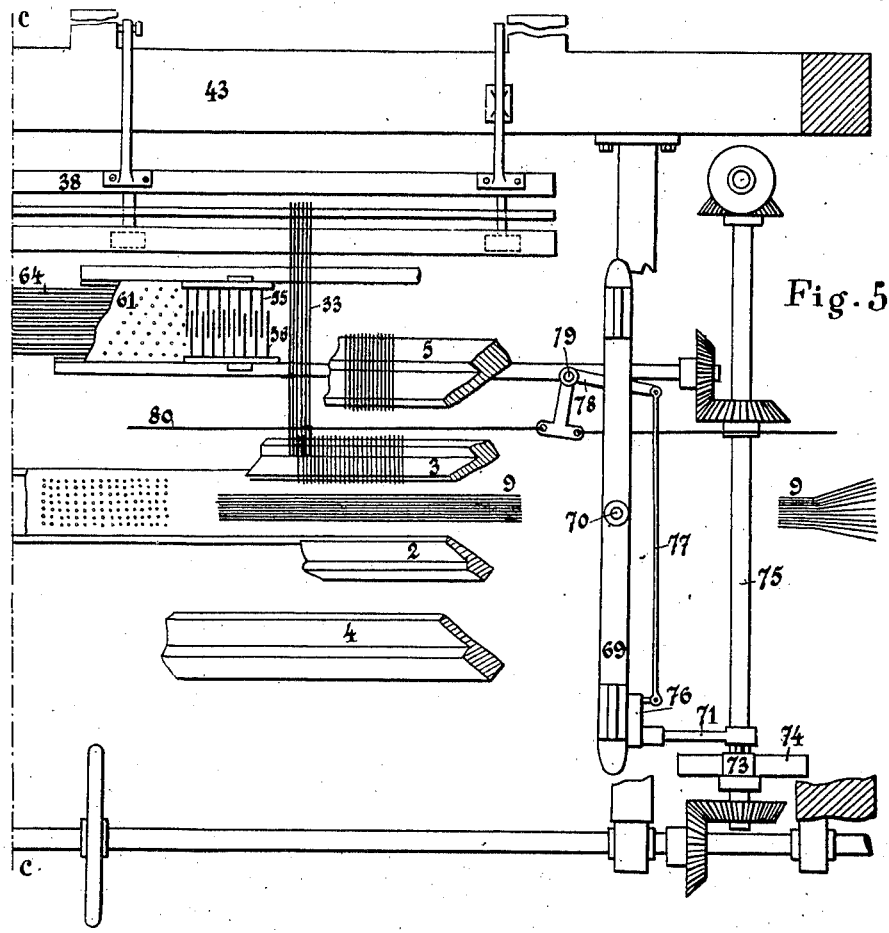
Fig. 5.
Fig. 7.
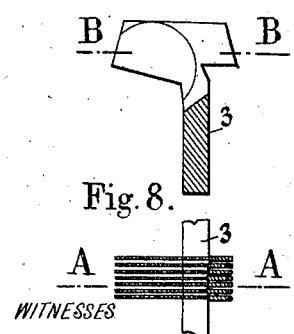
Fig. 8.
Fig. 9.
Fig. 10.
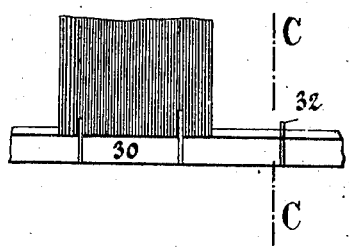
WITNESSES
INVENTOR
Jean Farigoule
BY
ATTORNEYS J. FARIGOULE.
LACE MACHINE.
APPLICATION FILED MAY 27, 1910.
1,112,996.
Patented Oct. 6, 1914.
10 SHEETS—SHEET 8.
Fig. 13.
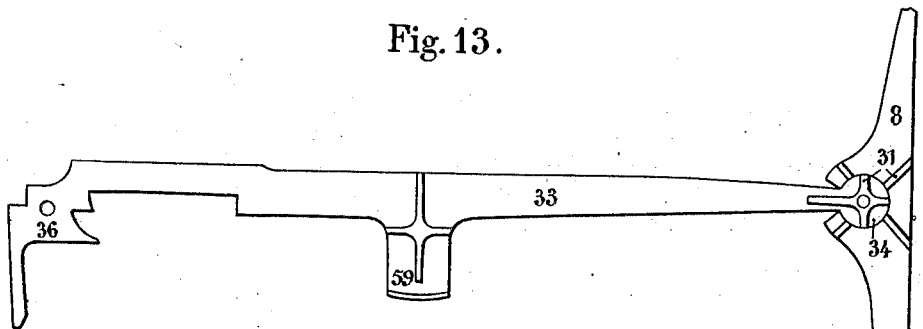
Fig. 19.
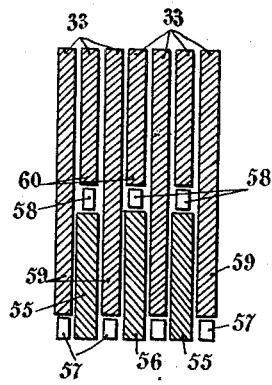
Fig. 11.
Fig. 12.
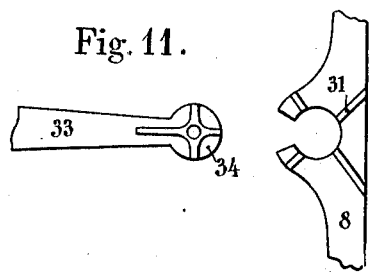
Fig. 15.
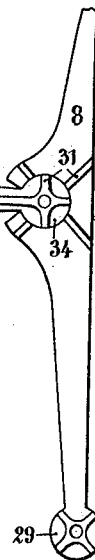
Fig. 14.
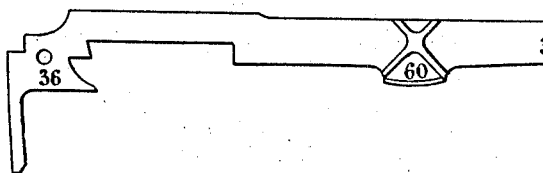
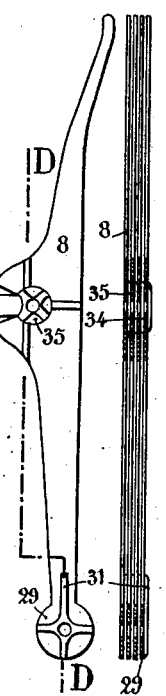
WITNESSES
J. P. Davis
INVENTOR
Jean Farigoule
BY
ATTORNEYS

J. FARIGOULE.
LACE MACHINE.
APPLICATION FILED MAY 27, 1910.

1,112,996.

Patented Oct. 6, 1914.
10 SHEETS—SHEET 9.

WITNESSES

INVENTOR
Jean Farigoule
BY
ATTORNEYS

J. FARIGOULE.
LACE MACHINE.
APPLICATION FILED MAY 27, 1910.
1,112,996.
Patented Oct. 6, 1914.
10 SHEETS—SHEET 10.
Fig. 29. Fig. 24. Fig. 21.
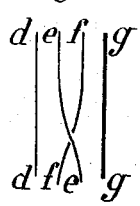
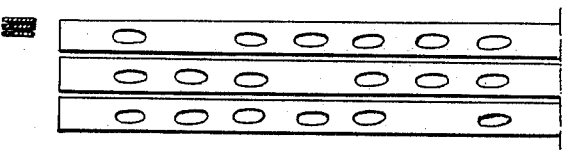
Fig. 30. Fig. 25. Fig. 22.
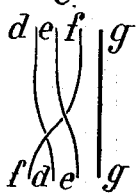
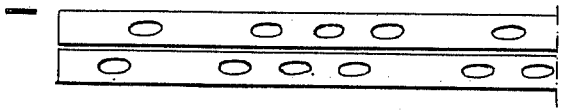
Fig. 31. Fig. 26. Fig. 23.
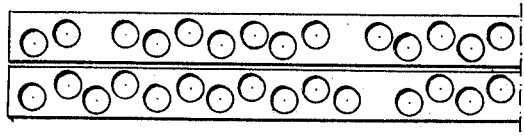
Fig. 32.
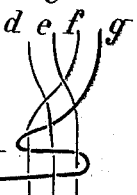
Fig. 27. Fig. 28.
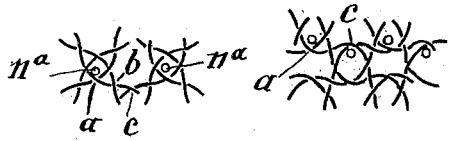
Fig. 33.
Fig. 35. Fig. 34.
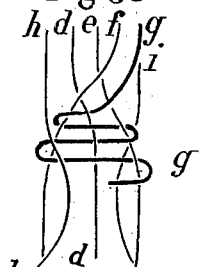
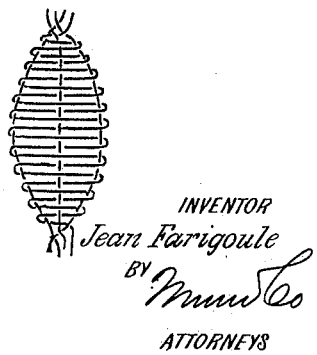
WITNESSES
INVENTOR
Jean Farigoule
BY
ATTORNEYS

UNITED STATES PATENT OFFICE.

JEAN FARIGOULE, OF PARIS, FRANCE.

LACE-MACHINE.

1,112,996.  Specification of Letters Patent.  Patented Oct. 6, 1914.

Application filed May 27, 1910. Serial No. 563,817.

*To all whom it may concern:*

Be it known that I, JEAN FARIGOULE, of 40 Rue des Jeuneurs, in the city of Paris, Republic of France, merchant, have invented Improvements in Lace-Machines, of which the following is a full, clear, and exact description.

The present invention has for object a machine for the manufacture of all kinds of lace made by hand by means of bobbins, the machine being combined so as to carry out all the operations effected in manufacture by hand.

In the manufacture of lace by hand the position of the threads is assured by pins which the workman places in the holes in the card bearing the pattern to be produced, and which are left in long enough to prevent the pattern formed from becoming distorted; the operator executes the pattern of the lace by crossing each time either two bobbins with each other or one bobbin with several others, and produces a lace as fine as the pricking off is itself more or less fine, that is to say, as the pins are more or less close to each other. The production of undistortible patterns of such varied and fine effects in manufacture by hand is due therefore:—1. to the pricking off at the desired points by pins left in place for the necessary time; 2. to the optional crossings at each passage of a bobbin either with another bobbin or with several bobbins; 3. to the fineness of the pricking off which forms the pattern.

The present invention for the manufacture of lace reproduces exactly the same effects as are obtained by manufacture by hand, because it possesses mechanism capable of carrying out the above specified conditions.

In tulle or imitation lace looms the crossings of the threads are raised at the center of the loom by two bars provided with points and forming combs and working alternately. While one of these bars raises the crossings just formed, the other bar with its points maintains at the center of the loom those which it has previously brought up, but it lets them go as soon as the first has arrived at its height. These points can therefore only maintain and hold back the threads during a certain time, as do the pins in hand manufacture; all the crossings brought up successively to the center of the loom become pressed against each other in a uniform manner. These looms cannot therefore reproduce the patterns of lace made by hand. Looms have also been invented having independent points worked individually by a jacquard operating mechanism, these points carrying the crossings to the desired points.

The loom which constitutes the subject matter of the present invention is characterized from these different systems of known looms by a special point device, combined so as to fulfil exactly the same function as the pins in hand manufacture. This device has a bar with points similar to that in ordinary looms, and a line of points independent of each other mounted on a level with the center of the loom, and receiving their motion from a jacquard through the medium of a special operating mechanism, combined so that certain of these points can remain engaged in the crossings of the threads while the others withdraw themselves; the point bar thus raises up at each movement the crossings which have just been formed, either against the points which have remained in place to produce some effect, or against the crossings previously formed at places where the points have been withdrawn.

The present loom is also combined so as to cross and interlace in any manner whatsoever, at each movement, the bobbin threads either with each other or with the warp or spool threads.

In the ordinary looms, it is only possible to make, between the bobbin threads and warp or spool threads, at each motion of the loom, crossings of a like kind, that is to say, the warp or spool threads pass according to the motion either all in front of or all behind the bobbin thread, all the carriages being driven simultaneously. The result of this is that when a warp or spool thread has to pass alternately in front of and behind several bobbin threads, the loom has to make, to cause this thread to pass, a number of motions equal to that of the bobbin threads encountered.

In lace looms, when all the crossings are executed exclusively with the bobbin threads, each series of crossings requires a stroke of the loom; if the crossings are executed with the bobbin threads and a warp or spool thread passing alternately in front of and behind these bobbin threads fewer motions are required, but always two strokes at least of the loom in the most favorable case, that is to say, if the crossings alternate regularly and more if the crossings alternate irregularly.

The present loom permits on the contrary of obtaining in a single motion any number of different crossings whatever their direction may be and the manner in which they alternate, it should be noted that this result cannot be obtained in hand manufacture, because the number of bobbins which the operator can handle at each passage or shot is necessarily very limited. This crossing of the bobbin threads and warp or spool threads is produced in the present loom by the employment of a special operating mechanism worked by a jacquard and producing optionally the stoppage or longitudinal movement of the external comb-bars.

In tulle or imitation lace looms, a sufficiently great fineness can be obtained owing to the simplicity of the operating mechanism of the carriages, which, being always driven simultaneously, may be fine and close to each other, but in looms for lace where it is necessary that the carriages be moved independently of each other, the necessity of employing special devices for driving each carriage has hitherto prevented laces of great fineness from being obtained.

The present loom permits, notwithstanding the jacquard driving of the points and of the carriages, of obtaining a fineness which is as great as is obtained in the ordinary looms; to this end it is provided with special devices for mounting, guiding, articulating, selecting and driving the carriages and their pull rods, the whole being combined so as to permit of the use of carriages of very small thickness very close to each other, and of consequently obtaining very great fineness.

The present loom, by the special constitution and combination of its essential devices, is capable of carrying out the operations of usual hand manufacture and of producing the same effects as are obtained by this latter.

The accompanying drawing shows, by way of example, the present system of loom.

Figure 4:
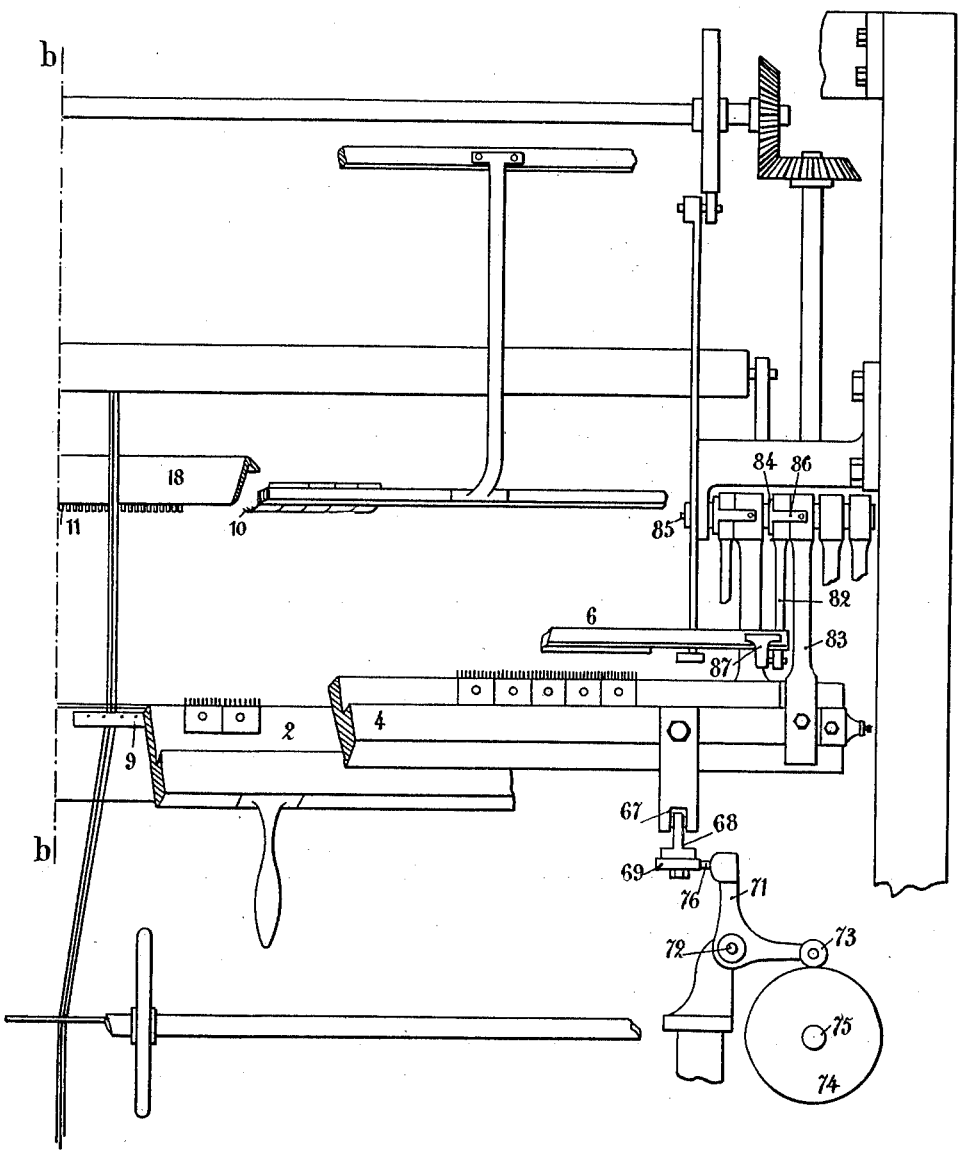
Figure 16:
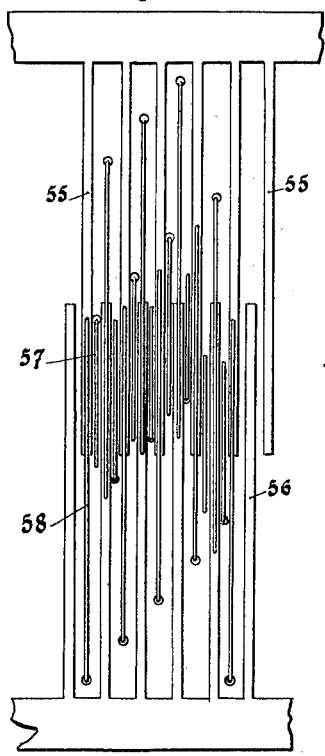
Figure 20:
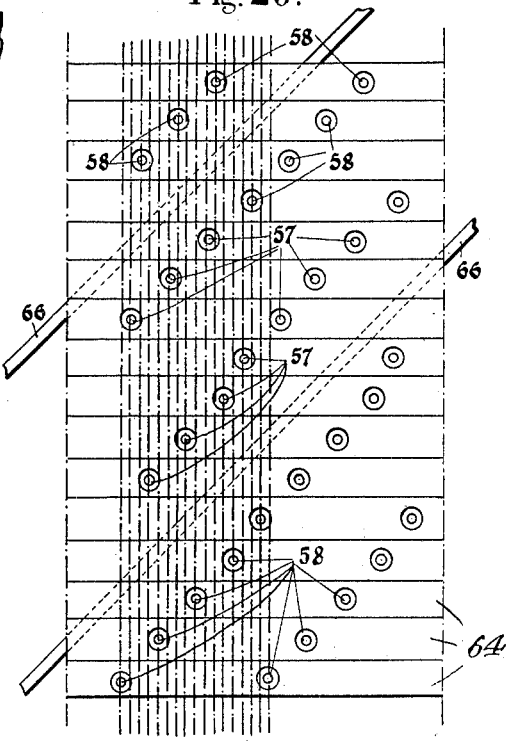
Figure 17:
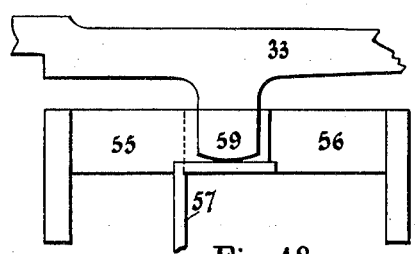
Figure 18:
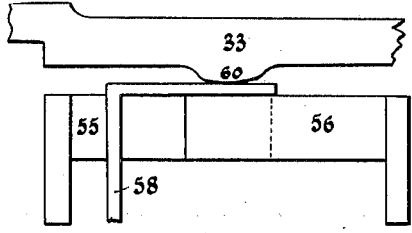

Figure 1 is a transverse section of the loom, the figure being carried upon two sheets of the drawings; Figs. 2 and 3 show different positions of the device with the jacquard driven points; Fig. 4 is a front view of the whole of the loom, certain parts being in section, the figure being carried upon two sheets of the drawings; Fig. 4ª illustrates the jacquards controlling the bars of the device; Fig. 5 is a corresponding plan, the figure being carried upon two sheets of the drawings; Fig. 6 is an end view showing the driving mechanism of the exterior comb-bars; Figs. 7 and 8 are two detail views of one of the middle comb-bars; Fig. 7 being a vertical section along the line A—A of Fig. 8; Fig. 8 is a horizontal section taken along the line B—B of Fig. 7. Figs. 9 and 10 are two detail views of the support for the selecting levers of the carriages, Fig. 9 being an elevation and Fig. 10 a transverse section taken along the line C—C of Fig. 9; Figs. 11 to 14 are detail views showing the arrangement and assemblage of the selecting levers and of the pull rods which drive these latter; Fig. 15 is a section taken along the line D—D of Fig. 14 and showing the juxtaposition of the different levers; Fig. 16 shows in plan the arrangement of the needles and of the combs actuating and guiding the pull rods; Figs. 17 and 18 are two detail views showing the mounting of the pull rods on their needles; Fig. 19 is a transverse section on an enlarged scale of the pull rods engaged between the teeth of the combs and resting on their needles; Fig. 20 is a plan view showing the distribution of the needles which drive the pull rods; Figs. 21, 22, 23 show different arrangements of bars intended for the driving of the needles working the pull rods of the selecting levers. Figs. 24, 25 and 26 show in horizontal sections the respective positions of the bars represented in Figs. 21, 22 and 23; Figs. 27 and 28 show two patterns made by the present system of loom; Figs. 29 to 33 show, on an enlarged scale, the different shots for the manufacture of a pattern called "Point d'Esprit" or "Mouche"; Fig. 34 shows the finished pattern; Fig. 35 shows a pattern made up of a number of superposed sections.

In the present improved loom the carriages 1 are conducted from the middle comb-bars 2, 3 to the front or rear comb-bars 4, 5 by catch bars 6, 7; each carriage is brought into engagement with the catch bar which has to operate it by a lever 8 worked by a jacquard apparatus as will be described hereafter.

The front comb-bar 2 is capable of being raised at the front so as to permit the operator to pass, without any difficulty, the warp or spool threads into the bars 9 seated between the two comb-bars 2 and 3; to this end the comb of this comb-bar is smaller, as is shown by Fig. 1.

The comb-bars 4 and 5, as well as the catch bars 6 and 7, are capable of receiving a to and fro movement in the longitudinal direction of the loom.

A point bar 10, mounted in the ordinary way in front of the loom, collects the crossings together and raises them to the center of the loom, when the carriages have been all brought back into the two comb-bars of the middle 2, 3.

At the back and at the level of the center of the loom, is arranged a row of points 11 corresponding to the points of the bar 10; these points 11, which are all independent of each other, are intended to fulfil the same function as the pins in the manufacture of lace by hand. These points 11 are guided by the combs 12 mounted on the fixed support 13. The combs 12 have a comb bar on which the heels of the point 11 rest the said heels passing between the teeth of the combs.

The advance and recoil movements of each point 11 is controlled by the following device. Each point 11 is jointed at 14 to a bent lever 15 movable about a shaft 16. All these various levers are guided in a comb 17 fixed upon the center bar 18 of the loom. Each lever 15 carries a needle 19 opposite which is arranged a set of perforated bars 20, operated by one of the jacquards of the loom, for example by the jacquard A, illustrated in Fig. 4ª and which works the bars 9 of the warp or spool threads; the bars 20 are movable in the supports 21 mounted on the shaft 16, and receive an intermittent oscillating motion from a cam 22 keyed on the rear shaft 23 of the loom, and engaging one end of a lever connected at its other end with the support 21, as is shown in Figs. 1 and 4.

The needles 19 of the levers 15 are not all in the same plane because owing to their very great closeness to each other it would be impossible to employ jacquard driving; these needles 19 are set out *en echelon*, as is shown in Fig. 1, and in such a way that the needles, driven by the same bars are situated at sufficient intervals to allow the perforations in the bars 20 to be easily made. According as the bars 20 present a solid or a perforated part to the needles 19 of the levers 15, these bars carried along in the oscillating movement of the support 21 keyed on the shaft 16, communicate or do not communicate a slight angular movement to these levers 15 in the direction of the arrow shown. By this angular movement the rear extremities of the levers 15 thus raised are brought opposite a bar 24 which receives an oscillating movement about a shaft 25; this movement is controlled by a cam 26 keyed on the rear shaft 23, the bar 24 carries along in its movement the levers 15 which it encounters, and these levers then transmit a recoil or backward movement to the corresponding points 11. In the recoil or backward movement (see Fig. 2), the heel of each point 11 engages in a box 27 movable vertically.

A device for producing vertical movement of the box 27 is shown in Fig. 1, and consists of a lever 27ª connected with the box and pivotally connected with a spring controlled member 27ᵇ, the latter being controlled by a cam 27ᶜ on the shaft 23. This device is given by way of example and it is obvious that any other suitable device might be used.

The box 27 lifts in its movement upward the heels of the points 11 which have been brought to the rear and thus communicates an angular movement to these points 11 about their pivots 14; in this movement the front ends of the points 11 are lowered as is shown in Fig. 2, so as to be able to enter again between the threads by passing beneath the point bar 10 at the front of the loom, which at this moment is raised to the center of the loom and engaged between the threads.

The forward movement of the points 11 takes place when the bar 24 returns to the rear; this movement is assured by a return bar 28 which is caused to act upon the rear ends of the levers 15.

At each motion of the loom, the needles of the levers 15, which are opposite a solid part of the bars 20 are engaged by said solid part, and the levers are raised and bring the points 11 back to the rear and disengage them from the tissue; on the contrary the levers 15, to the needles of which the bars 20 present a perforated part, remain stationary and the points 11 corresponding thereto remain engaged in the tissue. These points therefore fulfil the same function as the pins which are left stuck in the cushion in the manufacture of lace by hand; these points 11 may thus remain engaged in the tissue while several motions are made if it be necessary.

As has been stated above the carriages 1 are brought into engagement either with the front catch-bar 6, or with the rear catch-bar 7, by levers 8; for the manufacture of a fine lace however it is necessary to use carriages of very small thickness and placed very close to each other and, on the other hand it is indispensable to give to the levers 8 a sufficient thickness to prevent them from bending and passing beside the carriages which they are to drive. To this end to enable a thickness to be given to these levers which is greater than that of the teeth of the carriages, the teeth of the comb-bar at the center 3 are chamfered, as shown in Figs. 7 and 8 so that this comb-bar presents greater intervals at the part where the heads of the levers 8 move, than at the part where the carriages move. Each lever presents at its lower part a pivot foot 29 of circular form, engaged in a gutter 30 arranged along the whole length of the loom. This gutter 30 has a to and fro movement in a vertical direction for the purpose of engaging and disengaging at the desired moments the ends of the different levers 8 in the notches in the carriages 1 corresponding thereto.

The levers 8 bear against each other, but to prevent too great an amount of friction each lever has bosses 31 so that the frictional surfaces are very much reduced, (see Figs. 12 to 14).

The levers must not be jammed against each other so as not to be able to move freely, and there is therefore left a very small amount of play between them. In consequence of this play and of the very large number of levers which the loom has, it is necessary to prevent the levers from becoming jammed one against the other, because in such case owing to all the clearances becoming added together it would happen that the levers would no longer be properly spaced with regard to their respective carriages. In order therefore to avoid this movement of the levers the gutter 30 has, at intervals, at every ten centimeters for example, separator blades 32 (Figs. 9 and 10) of very small thickness, (a tenth of a millimeter for example or thereabout). Each lever receives its movement of oscillation from a pull rod 33; this pull rod is jointed to the lever which it has, and to this end it terminates in a head of circular form engaged in a circular gap in the lever. This mode of jointing permits of the levers and pull rods being of the same thickness throughout.

In order that the pull rods may be kept engaged in their respective levers, these pull rods and these levers have heads and gaps alternately of great and small diameter as shown in Figs. 11 to 15; the heads of great diameter 34 are thus held by the two adjacent levers, the gaps of small diameter of which cannot allow these heads of large diameter to pass, and the heads of small diameter 35 of the pull rods interposed between the preceding ones are retained in the gaps in the corresponding levers by the heads of great diameter 34 on the adjacent pull rods. The pull rods and the levers are thus jointed and held together without any auxiliary parts.

Each pull rod 33 has at its other end a heel 36 having steps arranged so that this pull rod shall be carried along in the movement of translation of the bars of rods 37, 38 which receive a movement of translation in the opposite direction. The guiding and the operation of these bars or rods is assured by the following device: The rod 37 is supported at intervals by arms 39, mounted upon rods 40 capable of sliding freely in two collars 41, 42 carried by the rear bar 43. The rod 40 receives a to and fro movement which is communicated to it by a bent lever 44, movable about a stationary shaft 45, and worked by a cam 46 keyed upon a shaft 47 arranged along the whole length of the loom and driven by the main front shaft (see Figs. 1 and 5). The rod 38 rests, at intervals, upon small fixed supports 48, and carries, opposite each of the supporting and guiding devices of the rod 37, an arm 49 terminating in a socket 50 capable of sliding freely upon the rod 40; each rod 40 is jointed to a lever 51 movable about a shaft 52 and jointed at its other end to an arm 53 integral with the arm 49 and fixed upon the rods 38. The to and fro movement of the rod 40 is thus communicated in an opposite sense to the rod 38. This device for supporting and guiding the bars or rods 37, 38 is repeated for example about every 80 centimeters. Under these conditions these bars or rods can never be exposed so as to become deformed under the action of resistances which they meet with on the part of the pull rods and their parallelism is perfectly assured. They consequently always communicate to the pull rods, over the whole length of the loom, movements which have rigorously the same amplitude. By the special constitution of these devices for support and guidance, the lubricating oil, necessary for the proper working of the mechanism, cannot get at the pull rods and consequently there is no fear of these pull rods becoming stuck together and so producing " misses." The bar or rod 38 is also connected to a return bar 54 intended to bring back to the rear the pull rods which have been previously thrust forward. By this set of bars 37, 38, 54 which move to and fro in the transverse direction of the loom the pull rods are carried along either toward the front or toward the rear or are not carried along according to the height they are at, that is to say according to the notches which they present opposite the bars or rods.

The pull rods which have been thrust toward the rear by the bar 37 engaging the notches in said pull rods, are brought back again to their original position by the movement of this same bar in the opposite direction. The pull rods which have been thrust toward the front by the bar 38 are brought back to their original position by the return bar 54. In consequence the movement apart of the bars 37, 54, or in other words the opening of the rods, shown at its maximum in Fig. 1, causes all the pull rods to be brought back again to their normal position in such a way that the levers jointed to these pull rods present their upper ends exactly opposite the notches of the carriages in which they have to engage on the upward movement of the gutter 30.

The pull rods are held and guided in their vertical movement and their to and fro movement by two combs 55, 56 engaging with each other and resting upon the angular needles 57, 58 by alternately long and short bearing surfaces 59, 60 on the pull rods (see Figs. 16, 17 and 18). The pull rods with the long bearing surfaces are engaged by the latter in the intervals comprised between the teeth of the comb 55 and those of the comb 56. The pull rods with the short bearing surfaces, interposed between the preceding ones, are above the teeth of these two combs and are guided and held by the preceding pull rods as is shown on an enlarged scale in Fig. 19.

The movement of the needles is less than the height of the teeth of the combs so that the needles 57, upon which the pull rods with the long bearing surfaces rest, may be always guided by these teeth. The total height of these pull rods at the place where they are supported, is likewise so calculated as to always guide the needles 58 which move between them and above the teeth of the combs.

The needles 58, which support the pull rods with the short bearing surfaces, are longer, and traverse the two combs 55, 56 in such a way that their vertical rods are engaged in the intervals in one of the combs and their rectangularly bent back arms rest on the upper part of the teeth of the other comb engaged in these intervals as is shown in Figs. 18 and 19.

The free space left between the teeth of each comb being superior to the thickness of the pull rods, a thickness superior to that of these latter may be given to the vertical rods of the needles 58. Owing to their bent back shape the needles whatever their position in the combs may be, all act at the same point of the pull rods and they all consequently communicate for the same lift the same movements to the pull rods. By means of this device the needles can be moved apart from each other and consequently the holes in the bars of the Jacquard driving mechanism which has to work them may be very wide apart.

The long and short needles are engaged in a guide box which is stationary and the top 61 and the bottom 62 of which has perforations intended to receive these needles; the top of this guide box constitutes a support for the bent arms of the short needles 57 when they are not raised. The lower ends of the needles 57, 58 project below the bottom of the guide box. Below this guide box moves a support 63 which receives a vertical movement to and fro and in which are mounted two superposed sets 64, 65 of perforated metal bars worked by a Jacquard apparatus B, as illustrated in Fig. 4ª.

The divisions of the metal bars 64, 65 are distributed so as to correspond to the distribution of the needles shown in Fig. 20. By this arrangement although the pull rods to be actuated have an excessively small thickness and are excessively close to each other, the divisions of the bars may be wide apart.

In the case of a very narrow lace of a width of say 16 mm. and requiring sixteen carriages, sixteen juxtaposed bars might be employed as shown in Fig. 20, each bar carrying along or not carrying along its needle with it in the vertical movement which it receives according as it presents to it a solid part or a perforation.

For the manufacture of wider laces requiring for example 32, 48 or 64 carriages, as it will not be possible to place these bars in the same plane, all alongside each other, they are superposed in rows of sixteen, so that the bars corresponding to the seventeenth, thirty-third and forty-ninth carriages are placed under the bar of the first carriage the bars corresponding to the eighteenth, thirty-fourth and fiftieth carriages under the bar of the second carriage and so on. The position of three of said superposed bars is indicated in Fig. 24.

In order that the bars of these superposed rows shall not interfere with each other in their working, each of these bars has supplementary holes permitting of the free passage of the needles driven by the other bars situated above them or below them as is shown in Fig. 21 which shows three superposed bars. Opposite a solid part of one bar the other two always present a perforation.

For the purpose of increasing the number of holes in these bars without increasing the size of the space occupied by them these holes are arranged in the following manner.

In the arrangement as shown in Fig. 22 two consecutive needles are driven by two juxtaposed bars. In the arrangement shown in Fig. 23 these two bars are replaced by two other superposed bars each having two lines of perforations, one line being for the combination of solid parts and perforated parts corresponding to the needles driven by the bar and a continuous line of perforations intended to allow in all positions a free passage to the needles driven by the other bar. By this arrangement the perforations of one line may be made in the middle of the intervals existing between the perforations of the other line, and the two lines of perforations may thus be brought much closer together than in the case where they are situated on two independent juxtaposed bars.

It should be quite understood that all these arrangements of perforated bars are only given by way of example, and that any other combination of perforations may be employed according to the various circumstances.

The metal bars are all of the length of the loom that is to say 4 to 5 meters; again the weight of the four to five thousand pull bars and needles which these bars have to raise requires that these bars be perfectly supported.

The oblique arrangement of the needles in the present loom allows the supports to be placed very close together to support the two rows of bars. These supports are constituted by the cross bars 66 arranged parallel with the oblique rows of needles as is shown in Figs. 5 and 20. By the combination of these bars 64, 65 with the needles 57, 58, with the pull rods 33 which said bars raise, and the operating mechanisms of said pull rods, the levers communicate to the carriages with which they are in engagement, at each motion of the loom, either a forward or a backward movement, or leave the carriages stationary. These carriages are thus brought into engagement either with the front catch-bar 6, or with the rear catch-bar 7, or remain in the middle comb bars 2, 3. The carriages caught up by the front and rear catch-bars are transported into the two front and rear comb bars 4 and 5. These two comb bars are, at pleasure, either moved in the longitudinal direction of the loom, for the purpose of making the carriage threads cross each other, or are kept stationary when the warp or spool threads have to work.

The movement of the front and rear comb bars is controlled by the following device: At each of their ends the two comb bars are connected by pieces 67, 68 to the ends of a lever 69 movable about a pivot 70 (see Figs. 4 and 5). Opposite one of the ends of each of these levers is arranged a bent lever 71, movable about a pivot 72 and carrying a roller 73 which is in contact with a cam 74 keyed upon a transverse shaft 75 of the loom (see Figs. 4 to 6).

Between the free end of the bent lever 71 and the lever 70 may be interposed at will a tappet 76, in such manner that the lever 69 may be carried along or not by the movement of the bent lever 71, according as this tappet is interposed or not (see Fig. 4). This tappet can slide freely in a groove made for this purpose in the lever 69 which carries it, and is connected by a rod 77 to a bent lever 78 movable about a stationary pivot 79 (see Fig. 5).

The two bent levers 78 are connected to each other by a cable or rod 80 and are driven from one side by the Jacquard apparatus which works the warp or spool thread bars and is held back on the other side by a tension spring 81.

The two tappets 76 are driven in such a way that when one comes into operation the other is thrown out of operation. By this arrangement the front comb bars can remain stationary as long as may be desired by providing that the tappets remain always in the same position.

The catch bars 6 and 7 corresponding to the two comb bars 4 and 5 are mounted in the following manner.

Each of the arms 82 carrying the catch bars is connected to the arm 83 which supports the corresponding comb bar by a fork 84 which engages with the pintle 85 of the loom and is provided with a lug 86 fixed on this arm 83. By this device the supports of the catch bars are carried along by the movement to and fro of the supports of the comb bars and can nevertheless move angularly relatively to these latter (see Figs. 4 and 6).

The catch bars rest upon the arms 82 and are held by bent arms 87 fixed to the end of these latter.

The roller threads pass in the ordinary way between the two middle comb bars.

The operation of the invention is as follows: At each motion of the loom, when the carriages 1 selected by the levers have been brought into the front or rear comb bars 4, 5, and when these latter have received their longitudinal movement, that is to say when the loom has effected, at the desired points, the crossings of the carriage threads with each other, the point comb 10 comes down, (see Fig. 3), to take hold of the crossings and bring them up to the center of the loom. The independent points 11 then come into operation, some remaining engaged in the tissue for the purpose of fulfilling the function of the pins stuck in the cushion in hand manufacture and the others the presence of which in the tissue is no longer of any use, are brought back to the rear, (see Fig. 2), and receive a slight angular movement downward, so as to engage in the tissue under the corresponding points of the comb 10 when they are brought forward. These points 11 are therefore for the purpose of holding back the crossings which have been previously brought up by these latter to the center of the loom. Each point 11 can be held in engagement with the tissue as long as is necessary without interfering with the working of the other points. The jacquard operated points 11, engaged in the tissue, maintain and hold back, during the desired time, the crossings on the center line of the loom, by preventing them from being carried along by the movement transmitted to the lace as it is manufactured, by the take up device, now shown. Thus for example in the case of the manufacture of the pattern represented in Fig. 27, points 11$^a$, engaged in the tissue prevent the crossings $a$ which have just been formed, from being carried along by the advance movement of the tissue and hold back these crossings on the center line of the loom while the formation of the succeeding crossings is going on. The three crossings $a$, $b$, $c$ can thus be obtained on one and the same line and constitute openings in the tissue. By leaving the points 11$^a$ engaged in the tissue for one more motion, the crossings $c$ last made can be carried higher than the crossings $a$ first made, as is shown in Fig. 28.

It will be understood that the jacquard operated points of the loom allow all kinds of patterns to be executed, and the same effects to be produced as are produced in the lace which is made by hand and also allows patterns to be formed which instead of being opaque present at certain places the necessary openings.

In the present loom the warp or spool threads like the supplementary bobbins employed by the lace worker in hand manufacture may likewise enter into the constitution of the network, and fulfil the same function as the carriage threads; this combination of warp or spool and carriage threads allows the fineness of the loom to be augmented and the number of motions to be reduced. Thus for example for the manufacture of the patterns called "Point d'Esprit" or "Mouche", the present loom allows of their being executed in a manner as perfect as if made by hand and with a very much smaller number of motions than are required by the ordinary looms.

Figs. 29 to 33 show, by way of example, the mode of manufacture of a section of a pattern as shown in Fig. 34 with the present loom by means of three bobbin threads $d$, $e$, $f$ and one warp or spool thread $g$. At the commencement, (see Fig. 29), the crossing of the bobbin threads $e$, $f$ is produced by the longitudinal movement of the comb bars on which have been brought the carriages of these threads $e$, $f$; on the next stroke of the loom the comb bars are brought back into their original position and this movement produces the crossings of the bobbin threads $d$, $f$, (see Fig. 30). From this moment onward the comb bars are no longer moved longitudinally and the warp or spool thread $g$ comes into action. The carriages of the threads $e$, $f$ are carried to the rear, the carriage of the thread $d$ is brought forward and the warp or spool thread $g$ goes across passing between the threads $e$, $f$ and behind the thread $d$, (see Fig. 31), in a single stroke of the loom. On the next stroke of the loom the carriage of the thread $d$ passes to the rear, the carriages of the threads $e$ and $f$ come to the front and the warp or spool thread $g$ passes in front of the thread $d$ and behind the threads $e$ and $f$ and so on. At the end of three or four shots, the carriage threads have resumed their normal distance apart, (see Fig. 32). At this moment when the two threads forming the edges of the section of the pattern have to be separated first one and then the other to increase the width of this section, the warp or spool thread $g$ ceases to work and the comb bars are brought back into operation so as to cause these threads to cross with the adjacent carriage threads $h$, $i$. The comb bars are again brought to a standstill and the warp or spool thread $g$ passes over the five carriage threads in a single motion, as is shown in Fig. 33, but in this case the carriage thread $h$ is always brought in front and the carriage thread $i$ always behind so as not to be caught by the warp or spool thread $g$. The warp or spool thread thus passes over five carriage threads and only seizes three of these threads. The width of the section of the pattern is thus increased by two carriages; it can be increased in the same way by four and more. When the section has attained its maximum width, the carriage threads $h$, $i$ not having been caught by the warp or spool thread $g$ are brought back to their normal place. When the adjacent carriage threads $h$, $i$ are themselves utilized for the production of a section, superposed sections of the kind represented by Fig. 35 will be obtained; very elaborate patterns may thus be produced and consequently very rich laces obtained.

By the special arrangement and combination of its constituent elements the present loom can therefore, as has been previously stated, have all the same effects and patterns as are obtained in manufacture by hand, and it should be quite understood that the dimensions and details of construction of these constituent elements may be modified.

It is to be understood that by the term jacquard is meant a drive by pattern cards.

Claims—

1. In a loom for the manufacture of lace, the carriages and bobbins, the combs for guiding the carriages, means for shifting the carriages, a point bar 10 for bringing the crossings to the center of the loom, movable points 11 independent from each other and arranged opposite the point bar 10, a jacquard for independently actuating each of said movable points 11, each of said points 11 being maintained engaged in the tissue in the operative position, during the required period, without being interfered with by the other points.

2. In a loom for the manufacture of lace, the carriages and bobbins, the combs for guiding the carriages, means for shifting the carriages, a point bar 10, for bringing the crossings to the center of the loom, movable points 11 independent from each other and arranged opposite the point bar 10, a bent lever 15 to which each point 11 is hinged, a needle 19 carried at the free end of each lever, perforated bars 20, a jacquard for actuating said perforated bars, said needle 19 being put in action when it encounters a solid part of said bars and remaining stationary when it encounters a perforation in said bars, a constantly rocking bar 24 into the path of which the bent lever is brought when said lever is put in action, the said lever being displaced by said rocking bar, a vertically movable box 27 into which the rear part of the respective point 11 is brought when the lever is displaced, the said box serving to bring the point 11 into the inoperative position, so that said points 11 may be lowered at the time they enter into the tissue.

3. In a loom for the manufacture of lace, a point bar 10 for bringing the crossings to the center of the loom, movable points 11 independent from each other and arranged opposite the point bar 10, a jacquard for independently actuating each of said movable points 11, the carriages 1 and the bobbins, two central comb bars 2, 3, a front catch bar 6, a rear catch bar 7, a lever 8 actuated to bring the carriages from said central comb bars either to a front catch bar or a rear catch bar, front and rear comb bars 4 and 5 to which said carriages are brought from said front and rear catch bars, the said front and rear comb bars being capable of receiving a to and fro motion in the longitudinal direction of the loom, so that during the operation of the movable points 11, the warp threads may be crossed together in any required manner.

4. In a loom for the manufacture of lace, the carriages 1, the operating levers 8, and the pull rods 33 placed in juxtaposition and having coöperating projections and recesses for jointing the levers and pull rods, the said recesses and projections being of different sizes for preventing the lateral escape of the inserted projection.

The foregoing specification of my improvements in and connected with the mechanical manufacture of lace signed by me this seventeenth day of May 1910.

JEAN FARIGOULE.

Witnesses:
H. C. COXE,
R. EHIRIOT.

Copies of this patent may be obtained for five cents each, by addressing the "Commissioner of Patents, Washington, D. C."